US011966448B2

(12) United States Patent
Sachindran et al.

(10) Patent No.: US 11,966,448 B2
(45) Date of Patent: Apr. 23, 2024

(54) INSTANT SEARCH RESULTS

(71) Applicant: Microsoft Technology Licensing, LLC, Redmond, WA (US)

(72) Inventors: Santhosh Sachindran, Campbell, CA (US); Raghavan Muthuregunathan, Fremont, CA (US); Vivek Katarya, Santa Clara, CA (US); Yuankun Xue, San Jose, CA (US); Ali Hooshmand, Menlo Park, CA (US); Xu Zhang, Santa Clara, CA (US); Poome Thavornvanit, New York, NY (US); Jiayu Li, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/940,987

(22) Filed: Sep. 8, 2022

(65) Prior Publication Data

US 2024/0086489 A1 Mar. 14, 2024

(51) Int. Cl.
*G06F 16/957* (2019.01)
*G06F 16/9532* (2019.01)

(52) U.S. Cl.
CPC ...... *G06F 16/9574* (2019.01); *G06F 16/9532* (2019.01); *G06F 16/9577* (2019.01)

(58) Field of Classification Search
CPC ............. G06F 16/9574; G06F 16/9532; G06F 16/9577
See application file for complete search history.

(56) References Cited

U.S. PATENT DOCUMENTS

| 9,830,367 B2 | 11/2017 | Baluja et al. |
| 10,275,503 B2 | 4/2019 | Baluja et al. |
| 2011/0047120 A1* | 2/2011 | Kamvar ............. G06F 16/3325 706/50 |

(Continued)

OTHER PUBLICATIONS

Diaz, et al., "Search Result Prefetching Using Cursor Movement", In Proceedings of the 39th International ACM SIGIR Conference on Research and Development in Information Retrieval, Jul. 17, 2016, pp. 609-618.

(Continued)

*Primary Examiner* — Kannan Shanmugasundaram
(74) *Attorney, Agent, or Firm* — NICHOLSON DE VOS WEBSTER & ELLIOTT LLP

(57) ABSTRACT

Implementations of the disclosed technologies pre-fetch search results. Implementations receive first input from a search session of a user device, where the first input includes at least a portion of a search term but does not initiate a search. Implementations determine context data associated with the first input, determine that a combination of the first input and the context data satisfies a pre-fetch threshold, determine intent data based on at least a portion of the context data, generate a search query based on the first input and the intent data, and pre-fetch a first subset of search results based on the search query. In response to a second input received subsequent to the first input, where the second input contains an initiate search signal, implementations initiate rendering of the pre-fetched first subset of search results in the search session at the user device.

20 Claims, 7 Drawing Sheets

(56) References Cited

U.S. PATENT DOCUMENTS

2011/0184936 A1\* 7/2011 Lymberopoulos ........................... G06F 16/9574
　　　　　　　　　　　　　　　　　　　　　　707/E17.014
2016/0275194 A1\* 9/2016 Borza ................... G06F 16/248
2019/0213186 A1 7/2019 Baluja et al.
2020/0401638 A1\* 12/2020 Galimovich ...... G06F 16/90324

OTHER PUBLICATIONS

White, et al., "Search Result Prefetching on Desktop and Mobile", In ACM Transactions on Information Systems, vol. 35, Issue 1, Jan. 2016, 35 Pages.

\* cited by examiner

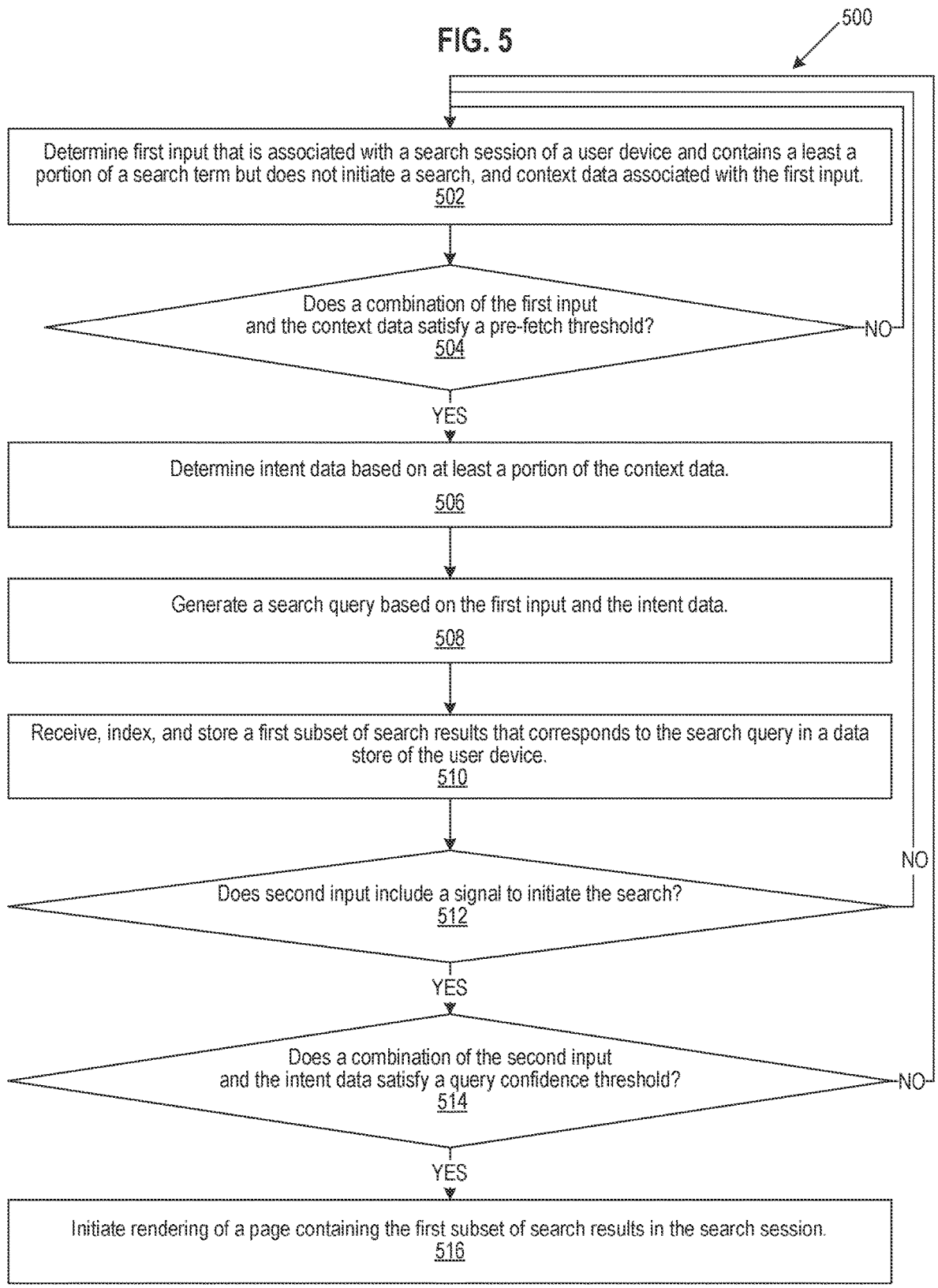

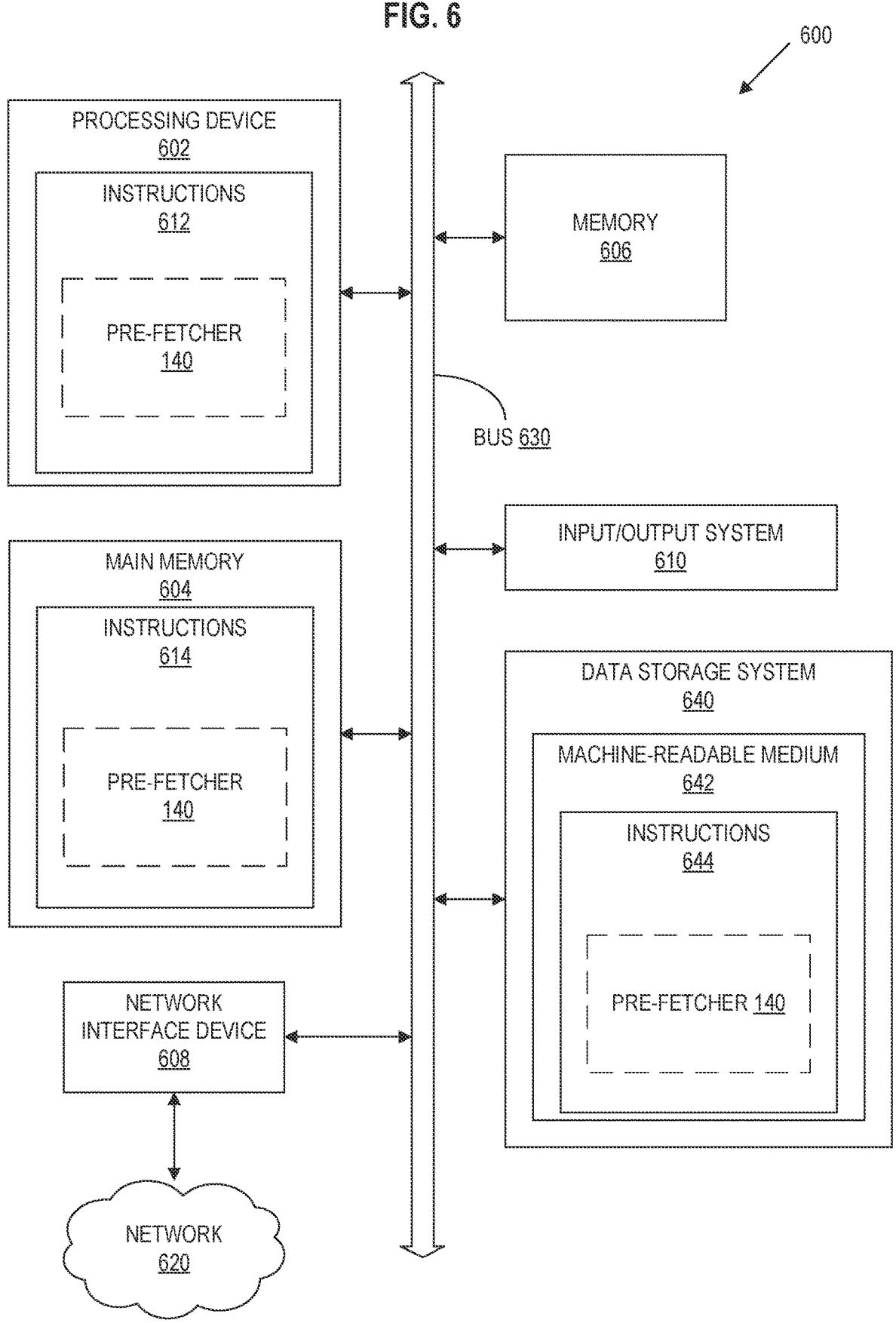

INSTANT SEARCH RESULTS

TECHNICAL FIELD

A technical field to which the present disclosure relates is information search systems, e.g., search engines. Another technical field to which the present disclosure relates is the retrieval and delivery of search results.

BACKGROUND

A search engine is a software program that helps people find information online. A user provides one or more search terms through a search interface. When the user is finished providing search terms, the user inputs a signal that tells the search engine to initiate the search. In response to the initiate search signal, the search engine formulates a search query based on the input provided by the user prior to the initiate search signal, executes the query to retrieve information that matches the query, and provides the retrieved information to the search interface.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

FIG. 5 is a flow diagram of an example method for pre-fetching search results in accordance with some implementations of the present disclosure.

FIG. 6 is a block diagram of an example computer system in which implementations of the present disclosure can operate.

DETAILED DESCRIPTION

Figure 1:
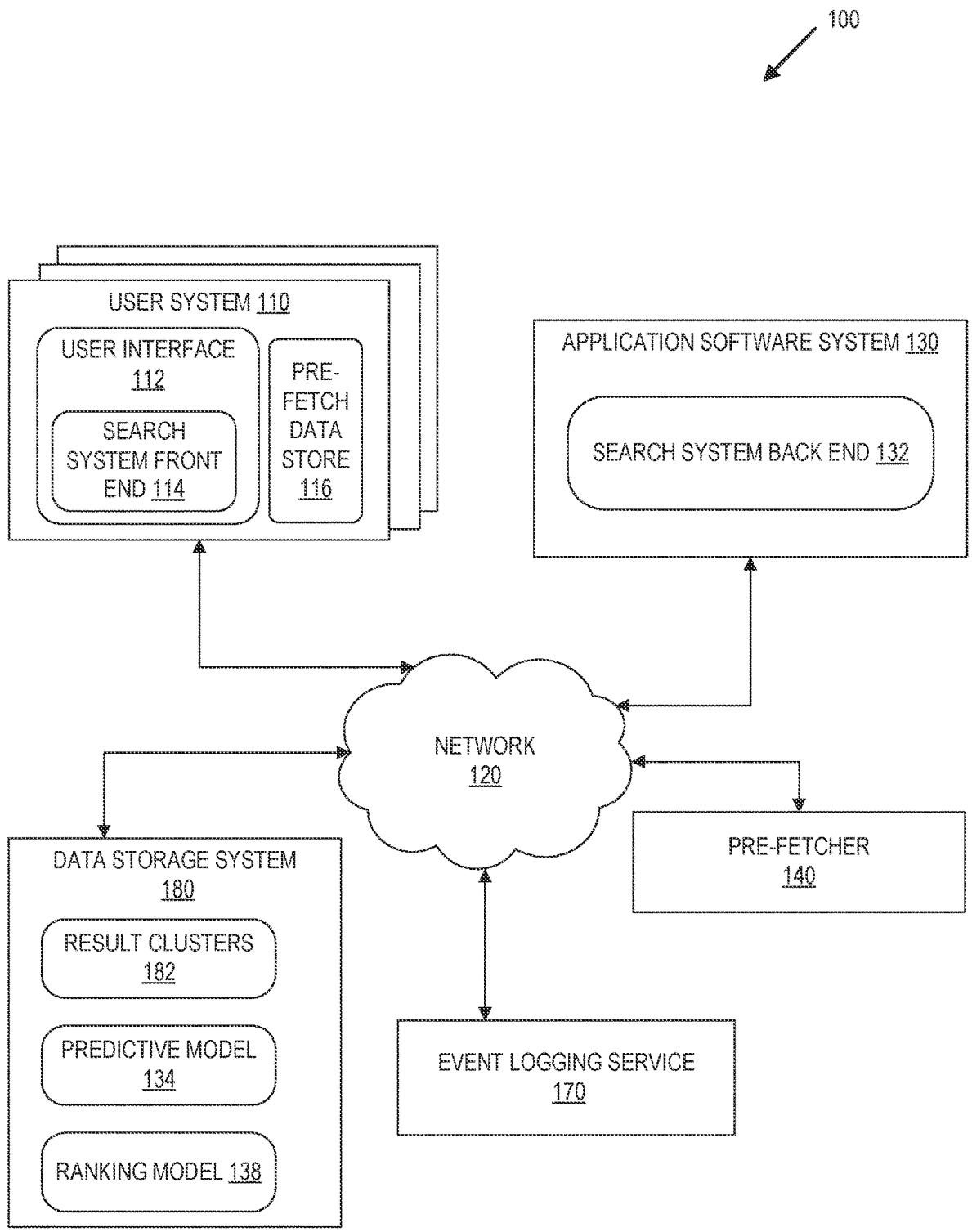
FIG. 1 illustrates an example computing system that includes a pre-fetcher in accordance with some implementations of the present disclosure.

Aspects of the present disclosure are directed to pre-fetching search result subsets and pre-constructing pages containing the pre-fetched search result subsets based on a partial search input that does not include an initiate search signal.

Pre-fetching as used herein refers to a process of retrieving a desired subset of search results from one or more storage locations and loading the desired subset of search results into a local data store at the user device after a user has started entering at least a partial search term but before the user takes an explicit action to initiate the search. An example of a user starting to enter a search term is a user typing the first few characters of a word into a text input box of a search interface. Examples of actions a user might take to explicitly initiate a search include issuing an enter command, a selection of a search element, a click, or a selection of an auto-generated search suggestion, also referred to as a typeahead suggestion.

Traditional search systems use a query and response approach in which the query is not executed and search results are not retrieved until after the user has taken an explicit action to initiate the search. Thus, traditional systems wait for an initiate search signal before beginning to retrieve relevant results. Also, traditional systems do not construct the result page until after the initiate search signal is received. In traditional systems, the result page is constructed with the entire result set and loaded into the search interface all at once.

While some traditional systems can determine and present typeahead suggestions, also referred to as autocomplete suggestions, these are suggestions designed to aid the user in formulating a search rather than actual results retrieved in response to a search. Thus far, traditional search systems have not preemptively generated result sets in the manner described herein.

Further, traditional search systems retrieve result sets by caching unique identifiers (e.g., URLs, Uniform Resource Locators) for individual search results. This caching of a unique identifier for each individual search result increases the amount of storage needed to hold the entire result set and slows down retrieval time. These and other shortcomings of traditional approaches can cause an undesirable delay between the time the user initiates the search and the time at which the results are presented to the user in the search interface. The length of the delay can vary depending on the size of the result set, network conditions, hardware (e.g., memory, processor, or input/output device) limitations and/or software constraints, whether at the user device, within the search system, or both.

Thus, a technical challenge is for search systems to reduce the latency associated with the retrieval, delivery, and presentation of relevant search results at the search interface, particularly in resource-constrained environments. Aspects of the present disclosure address the above challenges and other deficiencies by pre-fetching relevant result subsets. For example, a pre-fetched result subset as described herein is available prior to and as soon as the user makes an explicit call for the search request. Aspects of this disclosure pre-construct result pages containing pre-fetched result subsets so that the pre-constructed pages and pre-fetched result subsets are ready to be rendered as soon as an explicit initiate search signal is received from the user.

To pre-fetch a result subset, implementations determine the user's intended search based on a partial search input and context data, generate a corresponding search query, and fetch a first subset of search results that has a high probability of matching the user's intent. Examples of partial search inputs are individual characters or groups of individual characters of one or more search terms. Partial search inputs can also include clicks on typeahead suggestions.

Partial search terms can be hard to disambiguate. For example, if the system receives a partial search term of "beyon" it could be difficult for the system to determine whether to search for articles on Beyonce (a person) or Beyond Meat (a company). Implementations of the described approaches use context data associated with the partial search term to determine the user's intended entity type (e.g., person or company).

Examples of context data include typeahead suggestions, entity types associated with typeahead suggestions, the user's search history, the user's previous activity within the same online session or across previous sessions, the user's profile data (e.g., job title, geographic location, etc.), the number of characters in the partial search input (e.g., the number of characters already typed, also referred to as query length), click position of a typeahead suggestion or previously-presented search result (e.g., did the user click on the top-ranked typeahead suggestion or the nth-ranked typeahead suggestion, where n>1?), and the amount of time elapsed between user actions (e.g., how long did the user pause after entering an input, also referred to as a debouncing period). Other examples of context data include measurements of network, hardware, and/or software capabilities, such as measurements of network speed, network parameters of the communications network local to the user, the amount of available memory at the user's device, and the size of the display screen at the user's device.

Examples of intent data include semantic labels used to filter, sort, or group search results. Based on the partial search input and context data, implementations use a predictive model to determine the intent data, e.g., a semantic label to apply to a search term, or to select a search domain, or to filter a set of search results. For example, if the partial search term is "goog" and the context data indicates that the user is currently acting as a job candidate (user's entity type = job candidate) searching for jobs (intended query entity type=jobs), the intent data can include the semantic label of "job search," which corresponds to the "jobs" entity type and can be used to limit the pre-fetch to the jobs domain so that only job postings are returned by the pre-fetch. Alternatively, if the partial search term is "goog" and the context data indicates that the user is currently acting as a recruiter searching for job candidates, the intent data can include the semantic label of "people search," which corresponds to the "people" entity type and can be used to limit the pre-fetch to the people domain so that only user profiles (and not job postings, for example) are returned by the pre-fetch.

Implementations use a ranking model to, based on the intent data, rank search domains for pre-fetching, where each search domain can correspond to a different entity type. For instance, if the search system has grouped search results into different entity type clusters, the ranking model ranks the entity type clusters based on the probability that each cluster corresponds to the intent data. For example, if the user's intent is determined to be a job search, the ranking model ranks a results cluster that includes job postings higher than, for example, other results clusters that do not include job postings, so that the job postings results cluster will be pre-fetched first, before other results clusters.

Implementations stream the pre-fetched first, highest probability result subset to a local data store on the user's device. At the user's device, implementations construct a page containing the pre-fetched first, highest probability subset stored locally at the user's device, for example during a rendering phase of a page load. Examples of pages include search results pages, landing pages, and other web-based or mobile app-based pages that can be displayed on a user interface of a computing device. Other examples of pages are audio-based versions of visual results pages, generated using, e.g., a text-to-speech (TTS) generator.

In contrast to traditional approaches, some of the disclosed implementations index pre-fetched subsets (e.g., groups of search results) by an entity identifier (ID) for the group/subset, rather than individual result identifiers. That is, the entity ID is used as an index for an entire pre-fetched result subset, rather than indexing individual search results by URL. Thus, in some implementations, pre-fetched result subsets can be stored and retrieved quickly using the entity ID. The local availability of pre-fetched results reduces redundant requests across different search typeahead sessions. For example, prefetched results obtained for a specific entity (e.g., "software engineer in the Bay Area") in one session can be retrieved from the user's local data store in a subsequent session, thereby removing the need to make another, redundant, search request in the subsequent session. Also, the amount of memory needed to store result subsets is reduced in comparison to the traditional approaches because the entity ID is smaller in size (e.g., shorter text length) than a URL and only needs to be stored once for the entire result subset. In this way, use of the entity ID can facilitate the streaming of result sets to a local data store on the user's device even if, for example, network conditions and/or the amount of memory available at the local data store are constrained.

After receiving the pre-fetch search request, the pre-fetched result subset is stored locally, for example in a cache of the user's device, and the pre-fetched result subset is available to be loaded into the search interface even before, and as soon as, the user has taken an explicit action to initiate the search. As soon as the user takes an action to initiate the search, the locally stored, pre-constructed result subset page is loaded from the local data store into the search interface. In some implementations, other result subsets are pre-fetched and streamed to the user device in the background so that they are available to be loaded into the search interface if the user indicates that they would like to view more of the same type of results, or if the user's intent changes.

Implementations determine the user's intent and use that intent data to determine the highest-ranking result subset to be pre-fetched first. For example, the search system clusters search results into result subsets based on clustering criteria, e.g., a domain or a vertical, such as entity type. Examples of entity types are categories that can be used to group search results, such as jobs, companies, people, articles, recommendations, and locations. For instance, the search system groups search results into a jobs cluster that contains job postings, a people cluster that contains user profiles, and an article cluster that contains articles. The search back-end system then ranks the result subsets based on how well each result subset matches the user's intent data. If the user's intent is determined to be a job search, for instance, implementations rank the result subset that contains job postings higher than other result subsets that do not contain job postings, and then pre-fetch the jobs result subset before pre-fetching other result sets that do not contain job postings or which correspond to other entity types.

Implementations pre-construct a results page for the highest-probability result subset based on the partial search input and the intent data associated with the partial search input. In implementations that use a blended search results page, in which search results from multiple different entity types are displayed, the page pre-construction includes organizing the result subsets so that the user sees the highest-probability result subset first and other, lower-probability result subsets are displayed following the highest probability result subset. For instance, in a small form-factor implementation such as a mobile device, the highest-probability result subset is displayed at the beginning of a scrollable list, i.e., above the fold, so that the user can see the highest-probability results quickly, without having to scroll through the entire list of results.

Implementations continue pre-fetching result subsets and pre-constructing results pages iteratively as the user continues providing more search input during the user's same search session. For example, result subsets are pre-fetched and results pages are pre-constructed each time the user enters an additional text character in the search input box. Further, implementations continue pre-fetching result subsets and pre-constructing results pages in anticipation of the user's next action after the user issues an initiate search signal.

Table 1 below provides examples of how the described pre-fetching approaches can operate, in some implementations.

TABLE 1

Pre-fetching Examples.

| Partial Input | Intent Data | | Pre-Fetched Subset | First Result on Pre-Constructed Page |
|---|---|---|---|---|
| | Query | Entity Type | | |
| bill gat | Bill Gates | People | People Name = Bill Gates | Entity Type = People |
| meta rescin | Meta rescinds offer | Article | Article Content contains "Meta rescinds offer" | Entity Type = Article |
| goog | Google | Job | Jobs for Company Name = Google | Entity Type = Job Posting |

Figure 4A:
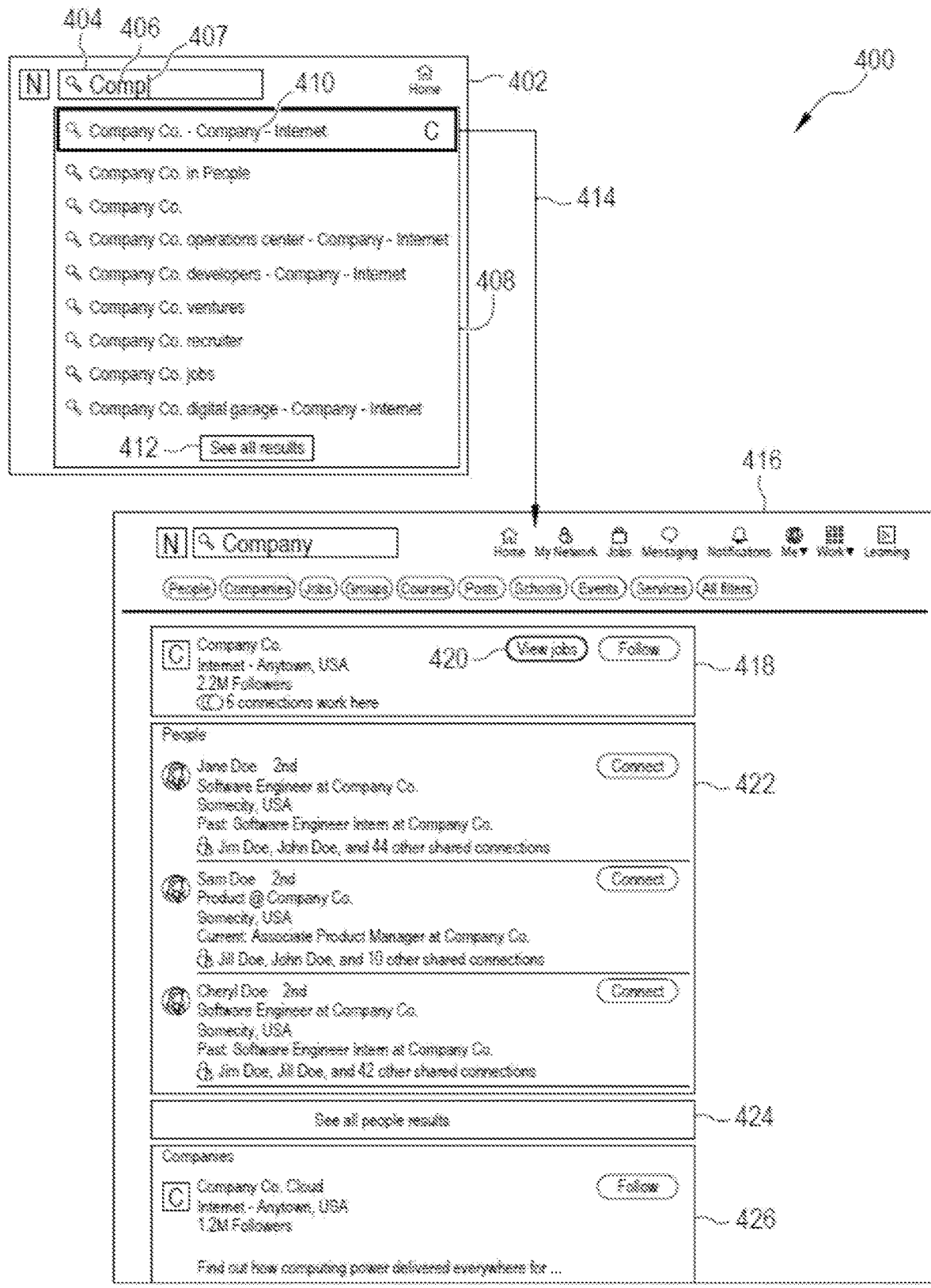
FIG. 4A is flow diagram of an example implementation of a pre-fetching method in accordance with some implementations of the present disclosure.
Figure 4B:
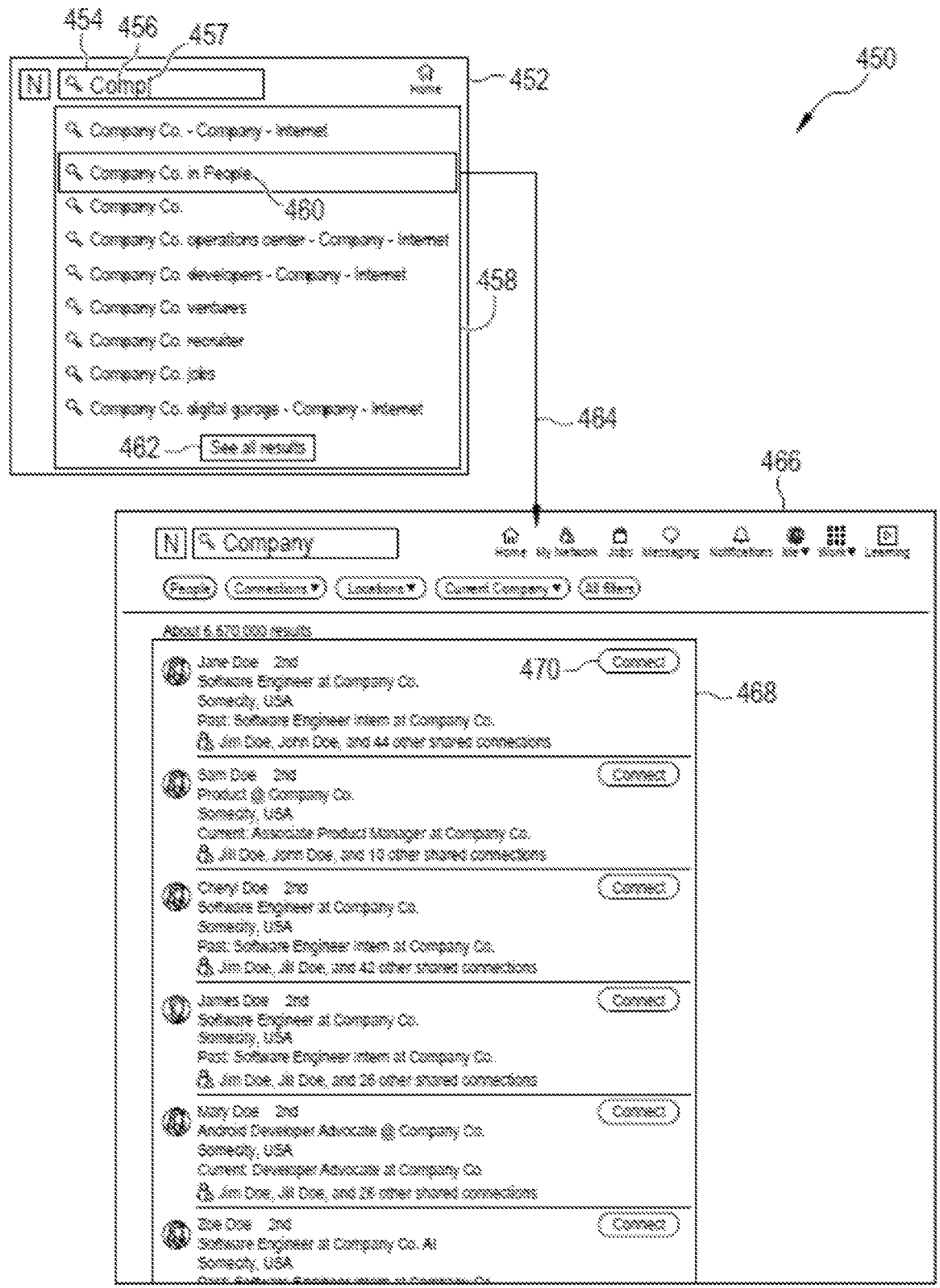
FIG. 4B is a flow diagram of another example implementation of a pre-fetching method in accordance with some implementations of the present disclosure.

As shown by Table 1, a partial input contains at least a portion of at least one search term. The partial input and context data are used to determine the intent data. For example, if the user selects a typeahead suggestion "Google—company," the intent data can indicate an intended query entity type of company. The partial input and intent data are used to generate a search query. The search query is used to pre-fetch a result subset. The intent data is also used to pre-construct a results page that corresponds to the intent data, so that by the time the user explicitly initiates the query, a set of search results is already available for instant rendering on the client by streaming the pre-fetched subset from a back end of the search system into the pre-constructed results page. The pre-constructed pages for different entity types have different configurations, in some implementations. For example, as shown in FIG. 4A and FIG. 4B, described below, the result pages for different entity types can have different arrangements of search results and user interface elements. Additional details of the disclosed approaches are described below, with reference to the figures.

In experiments, the disclosed approaches have been shown to improve the user's search experience as evidenced by usage metrics. Experiments also have shown that latency in results delivery and page loads is significantly reduced using the disclosed approaches. Experiments have reduced page load latency by over a hundred milliseconds (ms) in both web and mobile implementations. For example, in experiments on web-based implementations, page load latency was reduced by approximately 200-400 ms. In experiments on mobile implementations, page load latency was reduced by approximately 150-350 ms. Reduced latency further improves the scalability of the search system by enabling more complex queries to be completed with lower latency. Additionally, reduced latency enables the search system to deliver search results to user devices even in severely constrained environments such as limited network bandwidth and slower network transmission speeds.

The disclosed technologies are described in the context of a search system of an online network-based application software system. For example, news and entertainment apps installed on mobile devices, messaging systems, and social graph-based applications can all function as application software systems that include search systems. An example of a search use case is a user of an online system searching for jobs or job candidates over a professional social network that includes information about companies, job postings, and users of the online system.

Aspects of the disclosed technologies are not limited to social network applications, but can be used to improve search systems more generally. The disclosed technologies can be employed by many different types of network-based applications in which a search interface is provided, including but not limited to various types and forms of application software systems.

The disclosure will be understood more fully from the detailed description given below and from the accompanying drawings of various implementations of the disclosure. The drawings, however, should not be taken to limit the disclosure to the specific implementations, but are for explanation and understanding only.

FIG. 1 illustrates an example computing system that includes a pre-fetcher in accordance with some implementations of the present disclosure.

In the implementation of FIG. 1, computing system 100 includes one or more user systems 110, a network 120, an application software system 130, a pre-fetcher 140, an event logging service 170, and a data storage system 180.

As described in more detail below, application software system 130 includes a search system back end 132. Search system back end 132 generates search queries based on search inputs received at search system front end 114, executes the search queries, retrieves search results, such as result clusters 182, from one or more data stores, and provides search results to search front end 114. Search system back end 132 uses a predictive model 134 to determine intent data associated with search inputs. Search system back end 132 uses a ranking model to rank, sort, filter, or group search results. In some implementations, search system back end 132 includes one or more back end application program interfaces (APIs). Search system back end 132 includes portions of pre-fetcher 140, in some implementations. In other implementations, pre-fetcher 140 is a component of search system front end 114 or application software system 130, or a separate component of computing system 100. For example, pre-fetcher 140 can be implemented as a network service that is called by search system front end 114 or search system back end 132.

Pre-fetcher 140 is a combination of hardware and software that performs result subset pre-fetching and result page pre-constructing as described herein. Implementations of pre-fetcher 140 contain instructions that can be executed by one or more processors to perform operations shown in FIG. 2, FIG. 3, FIG. 4A, FIG. 4B, and/or FIG. 5 and described below with reference to FIG. 2, FIG. 3, FIG. 4A, FIG. 4B, and/or FIG. 5, for example. In some implementations, pre-fetcher 140 is or includes a client-side API that communicates bidirectionally with search system front end 114 and search system back end 132.

User system 110 includes at least one computing device, such as a personal computing device, a server, a mobile computing device, or a smart appliance. User system 110 includes at least one software application, including a user interface 112, installed on or accessible by a network to a computing device. In some implementations, user interface 112 is or includes a front-end portion of application software system. For example, implementations of user interface 112 include search system front end 114. Search system front end 114 includes instructions that can be executed by one or more processors to receive search inputs, auto-generate search suggestions, send search inputs and search suggestions to pre-fetcher 140, receive pre-fetched result subsets and pre-constructed pages from pre-fetcher 140, and render pre-constructed pages and result subsets on a display screen of user system 110. In some implementations, search system front end 114 is implemented as or as part of a web client.

User interface 112 is any type of user interface as described above. User interface 112 can be used to input search queries and view or otherwise perceive output that includes data produced by application software system 130. For example, user interface 112 can include a graphical user interface and/or a conversational voice/speech interface that includes mechanisms for scrolling and interacting with a news feed, entering a search query, and viewing query results and/or other digital content. Examples of user interface 112 include web browsers, command line interfaces, and mobile apps. User interface 112 as used herein can include application programming interfaces (APIs).

User system 110 also includes a pre-fetch data store 116. Pre-fetch data store 116 stores pre-fetched result subsets and pre-constructed result pages produced by pre-fetcher 140 during a user's search session, such that the contents of the data store are cleared once the search session ends or the browser closes. In some implementations, pre-fetch data store 116 uses an entity ID as a key to look up pre-fetched result subsets stored in pre-fetch data store 116 and provide pre-fetched result sets to search system front end 114. Pre-fetch data store 116 is implemented as a local cache, such as a cache that is separate from the main cache of the user system 110.

Application software system 130 is any type of application software system that provides or enables search functionality to user systems such as user system 110. Examples of application software system 130 include but are not limited to connections network software, such as social media platforms, and systems that are or are not based on connections network software, such as general-purpose search engines, job search software, recruiter search software, sales assistance software, content distribution software, learning and education software, or any combination of any of the foregoing.

Event logging service 170 captures user interface events such as search inputs, page loads, and clicks in real time, and formulates the user interface events into a data stream that can be consumed by, for example, a stream processing system. For example, when a user of application software system 130 enters a search term, taps the enter key, selects an auto-generated search suggestion, clicks on a user interface control, or loads a web page, or scrolls through a set of search results, event logging service 170 fires an event to capture an identifier, an event type, a date/timestamp at which the user interface event occurred, and possibly other information about the user interface event, such as the impression portal and/or the impression channel involved in the user interface event (e.g., device type, operating system, etc.). Event logging service 170 generates a data stream that includes one record of real-time event data for each user interface event that has occurred. Event logging service 170 captures user interface events on a per-session basis such that each session of each user of application software system 130 may generate an event stream that is captured by event logging service 170. As such, event logging service 170 can provide user interface event data for multiple users and sessions to other systems and services, such as pre-fetcher 140.

Time as used in the context of terminology such as real-time refers to a time delay introduced by the use of computer technology, e.g., by automated data processing and/or network transmission, where the time delay is the difference in time, as measured by a system clock, between the occurrence of an online event and the use of data processed in response to the event, such as for display, feedback, and/or control purposes.

Data storage system 180 includes data stores and/or data services that store digital content items, data received, used, manipulated, and produced by application software system 130. Alternatively or in addition, data storage system 180 includes data stores and/or data services that store data received, used, manipulated, and produced by pre-fetcher 140. Implementations of data storage system 180 store result clusters 182, predictive model 134, and ranking model 138. Result clusters 182 are sets of search results generated by search system back end 132 that are grouped by a clustering criterion such as entity type.

Predictive model 134 is a database, a rules engine, or a trained machine learning system that generates an output that has a high probability of corresponding to an input. For example, predictive model 134 determines and outputs user intent data that are highly correlated with inputs that include a partial search and context data associated with the partial search. Machine learning implementations of predictive model 134 are trained on, for example, training data that includes combinations of partial searches, context data, and ground-truth intent labels.

Ranking model 138 is a database, a rules engine, or a trained machine learning system that ranks search results based on a ranking criterion, such as user intent. For example, ranking model 138 generates and outputs a ranking score for each search result in a result set, where the ranking score represents a probability of the search result corresponding to the ranking criterion, and sorts the result set based on the ranking scores. Machine learning implementations of ranking model 138 are trained on, for example, training data that includes combinations of intent data, search results, and ground-truth similarity scores.

In some implementations, data storage system 180 includes multiple different types of data storage and/or a distributed data service. As used herein, data service may refer to a physical, geographic grouping of machines, a logical grouping of machines, or a single machine. For example, a data service may be a data center, a cluster, a group of clusters, or a machine.

Data stores of data storage system 180 can be configured to store data produced by real-time, near real-time (also referred to as nearline), and/or offline (e.g., batch) data processing. A data store configured for real-time data processing can be referred to as a real-time data store. A data store configured for near real-time data processing can be referred to as a near real-time data store or nearline data store. A data store configured for offline or batch data processing can be referred to as an offline data store. Data stores can be implemented using databases, such as key-value stores, relational databases, and/or graph databases. Data can be written to and read from data stores using query technologies, e.g., SQL or NoSQL.

A key-value database, or key-value store, is a nonrelational database that organizes and stores data records as key-value pairs. The key uniquely identifies the data record, i.e., the value associated with the key. The value associated with a given key can be, e.g., a single data value, a list of data values, or another key-value pair. For example, the value associated with a key can be either the data being identified by the key or a pointer to that data. A relational database defines a data structure as a table or group of tables in which data are stored in rows and columns, where each column of the table corresponds to a data field. Relational databases use keys to create relationships between data stored in different tables, and the keys can be used to join data stored in different tables. Graph databases organize data using a graph data structure that includes a number of interconnected graph primitives. Examples of graph primitives include nodes, edges, and predicates, where a node stores data, an edge creates a relationship between two nodes, and a predicate is assigned to an edge. The predicate defines or describes the type of relationship that exists between the nodes connected by the edge.

Data storage system 180 resides on at least one persistent and/or volatile storage device that can reside within the same local network as at least one other device of computing system 100 and/or in a network that is remote relative to at least one other device of computing system 100. Thus, although depicted as being included in computing system 100, portions of data storage system 180 can be part of computing system 100 or accessed by computing system 100 over a network, such as network 120.

While not specifically shown, it should be understood that any of user system 110, network 120, application software system 130, pre-fetcher 140, event logging service 170, and data storage system 180 includes an interface embodied as computer programming code stored in computer memory that when executed causes a computing device to enable bidirectional communication with any other of user system 110, network 120, application software system 130, pre-fetcher 140, event logging service 170, and data storage system 180 using a communicative coupling mechanism. Examples of communicative coupling mechanisms include network interfaces, inter-process communication (IPC) interfaces and application program interfaces (APIs).

A client portion of application software system 130 can operate in user system 110, for example as a plugin or widget in a graphical user interface of a software application or as a web browser executing user interface 112. In an implementation, a web browser transmits an HTTP request over a network (e.g., the Internet) in response to user input that is received through a user interface provided by the web application and displayed through the web browser. A server running application software system 130 and/or a server portion of application software system 130 can receive the input, perform at least one operation using the input, and return output using an HTTP response that the web browser receives and processes.

Each of user system 110, application software system 130, pre-fetcher 140, event logging service 170, and data storage system 180 is implemented using at least one computing device that is communicatively coupled to electronic communications network 120. Any of user system 110, application software system 130, pre-fetcher 140, event logging service 170, and data storage system 180 can be bidirectionally communicatively coupled by network 120. User system 110 as well as one or more different user systems (not shown) can be bidirectionally communicatively coupled to application software system 130.

A typical user of user system 110 can be an administrator or end user of application software system 130 or pre-fetcher 140. User system 110 is configured to communicate bidirectionally with application software system 130 or pre-fetcher 140 over network 120.

The features and functionality of user system 110, application software system 130, pre-fetcher 140, event logging service 170, and data storage system 180 are implemented using computer software, hardware, or software and hardware, and can include combinations of automated functionality, data structures, and digital data, which are represented schematically in the figures. User system 110, application software system 130, pre-fetcher 140, event logging service 170, and data storage system 180 are shown as separate elements in FIG. 1 for ease of discussion but the illustration is not meant to imply that separation of these elements is required. The illustrated systems, services, and data stores (or their functionality) can be divided over any number of physical systems, including a single physical computer system, and can communicate with each other in any appropriate manner.

Network 120 can be implemented on any medium or mechanism that provides for the exchange of data, signals, and/or instructions between the various components of computing system 100. Examples of network 120 include, without limitation, a Local Area Network (LAN), a Wide Area Network (WAN), an Ethernet network or the Internet, or at least one terrestrial, satellite or wireless link, or a combination of any number of different networks and/or communication links.

Further details with regard to the operations of pre-fetcher 140 are described below.

Figure 2:
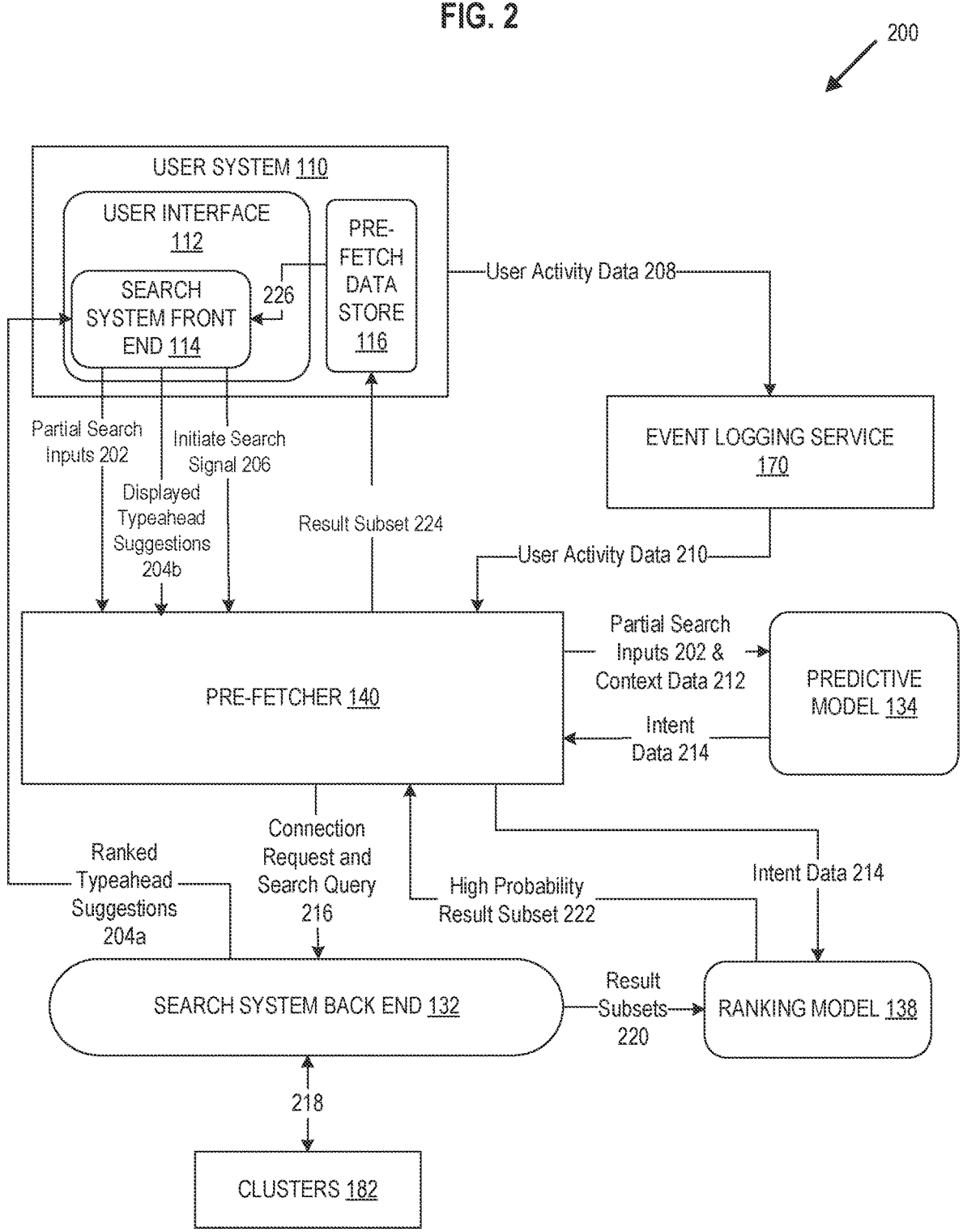
FIG. 2 is a flow diagram of an example method for pre-fetching search results in accordance with some implementations of the present disclosure.

FIG. 2 is a flow diagram of an example method for pre-fetching search result subsets in accordance with some implementations of the present disclosure.

The method 200 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some implementations, the method 200 is performed by pre-fetcher 140 in cooperation with application software system 130 and user system 110. Although shown in a particular sequence or order, unless otherwise specified, the order of the processes can be modified. Thus, the illustrated implementations should be understood only as examples, and the illustrated processes can be performed in a different order, and some processes can be performed in parallel. Additionally, one or more processes can be omitted in various implementations. Thus, not all processes are required in every implementation. Other process flows are possible.

As shown in FIG. 2, in operation, a user operating a user system 110 provides one or more partial search inputs 202 to search system front end 114 via a search input box of user interface 112. Search system front end 114 receives one or more typeahead suggestions 204a that have been generated and ranked by, for example, a typeahead service of search system back end 132. Search system front end 114 displays a subset of the typeahead suggestions 204b in rank order on the user via user interface 112. The process by which the search typeahead backend service generates and ranks typeahead suggestions 204a is not specifically shown in FIG. 2 but generally includes ranking a pre-determined set of search suggestions based on the partial search inputs 202. For example, the typeahead suggestion that is displayed in the first position of a list of selectable typeahead suggestions has the highest probability of corresponding to the one or more partial search inputs 202. Examples of typeahead suggestions 204 are shown in FIG. 4A and FIG. 4B, described below. The typeahead suggestions 204a, 204b can and often do change as the user provides additional partial search inputs 202, for example, as the confidence in the user's search intent increases.

Before the user enters an explicit initiate search signal 206, search system front end 114 provides partial search inputs 202 and ranked typeahead suggestions 204b to pre-fetcher 140 if threshold conditions for pre-fetch, described in more detail below, are met. For example, front end 114 provides the typeahead suggestions 204b displayed in the top n positions to pre-fetcher 140, where n is a positive integer greater than zero. Front end 114 also gathers context data 212 associated with the partial search inputs 202. Context data 212 includes, for example, the top-ranked typeahead suggestions 204, query length, debouncing period, and/or portions of user activity data 208. User activity data 208 is generated by user interface 112 as a result of user interactions with search system front end 114 and/or other portions of user interface 112. Examples of user activity data 208 include search inputs entered by the user, clicks on search results, user interactions with typeahead suggestions, user interface controls, and search results. User activity data 210 is provided to pre-fetcher 140 directly from user interface 112 or indirectly through, e.g., event logging service 170. In some implementations, user activity data 210 is a modified or aggregated form of user activity data 208. For example, user activity data 210 can include in-session user interface event data of a single user or cross-session user interface event data of the same user and/or one or more other users.

If a combination of the partial search inputs 202 and the context data 212 satisfies a pre-fetch threshold, pre-fetcher 140 provides partial search inputs 202 and portions of context data 212 to predictive model 134. A combination of the partial search inputs 202 and the context data 212 satisfies the pre-fetch threshold if, for example, the query length of the partial search inputs 202 is longer than a threshold query length, the debouncing time is longer than a threshold debouncing time, or network speed or bandwidth is faster than a threshold network speed or bandwidth.

Alternatively or in addition, a machine learning model trained to determine query intent based on a partial query determines, based on the context data 212, a session entity type associated with the partial search inputs 202 and the current search session, and provides the session entity type to pre-fetcher 140. The session entity type is an entity type of or associated with the user during the current search session. For example, if the machine learning model determines, based on the partial query and context data, that the user is acting as job recruiter during the current search session, the machine learning model outputs a session entity type of recruiter. Similarly, if the machine learning model determines, based on the partial query and context data, that the user is acting as a job seeker during the current search session, the machine learning model would output a session entity type of job seeker. The user's entity type can change from session to session. Thus, the current session entity type can be used to determine the user's intent in the current search session.

While not specifically shown in FIG. 2, the session entity type is determined by applying a predictive model similar to predictive model 134 to a combination of the partial search inputs and context data 212. The predictive model used to determine session entity type outputs a session entity type and a confidence value associated with the session entity type. The confidence value is a probabilistic value or a statistical value indicating a likelihood that the session entity type matches the user's actual intent. Machine learning implementations of the predictive model used to determine session entity type are trained, for example, using training data that includes combinations of search inputs, context data, and ground-truth session entity type values. If the session entity type confidence value satisfies a threshold session entity type confidence value, pre-fetcher 140 provides partial search inputs 202 and portions of context data 212 to predictive model 134. A session entity type satisfies the pre-fetch threshold if, for example, the session entity type confidence value exceeds a predetermined threshold confidence value, such as ninety percent.

Predictive model 134 generates and outputs intent data 214. Intent data 214 includes, for example, a highest probability typeahead suggestion 204b and/or a query entity type associated with the partial search inputs 202. Whereas the session entity type indicates the entity type of the user in the current search session, the query entity type indicates the entity type associated with the partial search inputs 202, e.g., a particular category of or filter to be applied to search results. For example, if the session entity type is recruiter (i.e., the user is currently acting as a recruiter as opposed to a job seeker), the query entity type could be job candidates. If the session entity type is job seeker, the query entity type could be job postings.

Predictive model 134 generates and outputs a confidence value associated with the intent data 214. The confidence value is a probabilistic value or a statistical value indicating a likelihood that the intent data 214 matches the user's actual intent. If the confidence value generated by predictive model 134 satisfies a confidence threshold, then based on the partial search inputs 202 and the intent data 214, pre-fetcher 140 generates a search query. The confidence value satisfies the confidence threshold if, for example, the confidence value exceeds a pre-defined confidence threshold value (e.g., ninety percent).

Still prior to receiving initiate search signal 206, pre-fetcher 140 sends the search query along with a connection request 216 to search system back end 132. The connection request includes a request to open a real-time persistent connection between search system front end 114 and search system back end 132 so that result subsets can be streamed to the user system 110, for example through the real-time connection. In some implementations, the result sets are streamed through a persistent real-time connection established by the pre-fetcher 140 subscribing to an event log on a server of the search system back end 132, where the event log corresponds to the search query, listening for search results published by the server on the event log, and receiving the first subset of search results on the persistent connection.

Search system back end 132 retrieves result subsets 220 that correspond to the search query from clusters 182 and provides the result subsets to ranking model 138. Ranking model 138 ranks the result subsets 220 based on the intent data 214 and provides a first highest probability result subset 222 to pre-fetcher 140. The high probability result set 222 is streamed to pre-fetch data store 116.

Still before the user has provided initiate search signal 206, front end 114 pre-constructs a page 224 to display the high probability result subset 222. The page 224 is populated with result set 222 retrieved from pre-fetch data store 116 when the initiate search signal 206 is received. If the user's search session ends, or a period of time after which the page 224 is determined to be stale has elapsed, page 224 is not populated with result set 222. At 226, pre-fetcher 140 receives the initiate search signal 206, determines that a query confidence value based on a combination of the initiate search signal 206 and the intent data satisfies a query confidence threshold associated with the search query, and initiates loading of the page 224 including result set 222 into the user interface by search system front end 114.

The query confidence threshold is used to determine whether the pre-fetched result subset matches the user's actual intent as evidenced by the initiate search signal 206 once the initiate search signal 206 is received. The query confidence value is a probabilistic value or a statistical value indicating a likelihood that the combination of the initiate search signal 206 and the intent data 214 matches the user's actual intent at the time of the initiate search signal 206. The query confidence value is generated by applying a predictive model similar to predictive model 134 to the combination of the initiate search signal 206 and the intent data. Machine learning implementations of the predictive model used to generate the query confidence value are trained using training data that includes combinations of initiate search signals and intent data. The query confidence value satisfies the query confidence threshold if, for example, the query confidence value exceeds a pre-defined confidence threshold value (e.g., ninety percent).

If the query confidence value satisfies the query confidence threshold, the corresponding result subset stored in pre-fetch data store 116 is loaded into the results page and rendered in the user interface 112. If the query confidence value does not satisfy the query confidence threshold, the corresponding result subset stored in pre-fetch data store 116 is not loaded or rendered in the user interface 112. That is, if the intent indicated by the initiate search signal 206 is different from the intent used to pre-fetch the result subset, the page containing the pre-fetched result subset is not rendered. For example, if the query entity type or top-ranked typeahead suggestion predicted by the system prior to receipt of the initiate search signal 206 is company but the user actually selects a typeahead suggestion with an entity type of people, the pre-fetched result subset for the entity type of company is not rendered.

In some implementations, pre-fetcher 140 opens a real-time persistent connection with the search system back end 132 through which subsequent result subsets are streamed to the user device in rank order after page 224 is loaded, so that if the user clicks on, for example, a "see more" button, the next highest-ranked result subsets are streamed to the user device through the persistent connection, and loaded directly into the page 224 by search system front end 114 without being stored in the data store 116.

Figure 3:
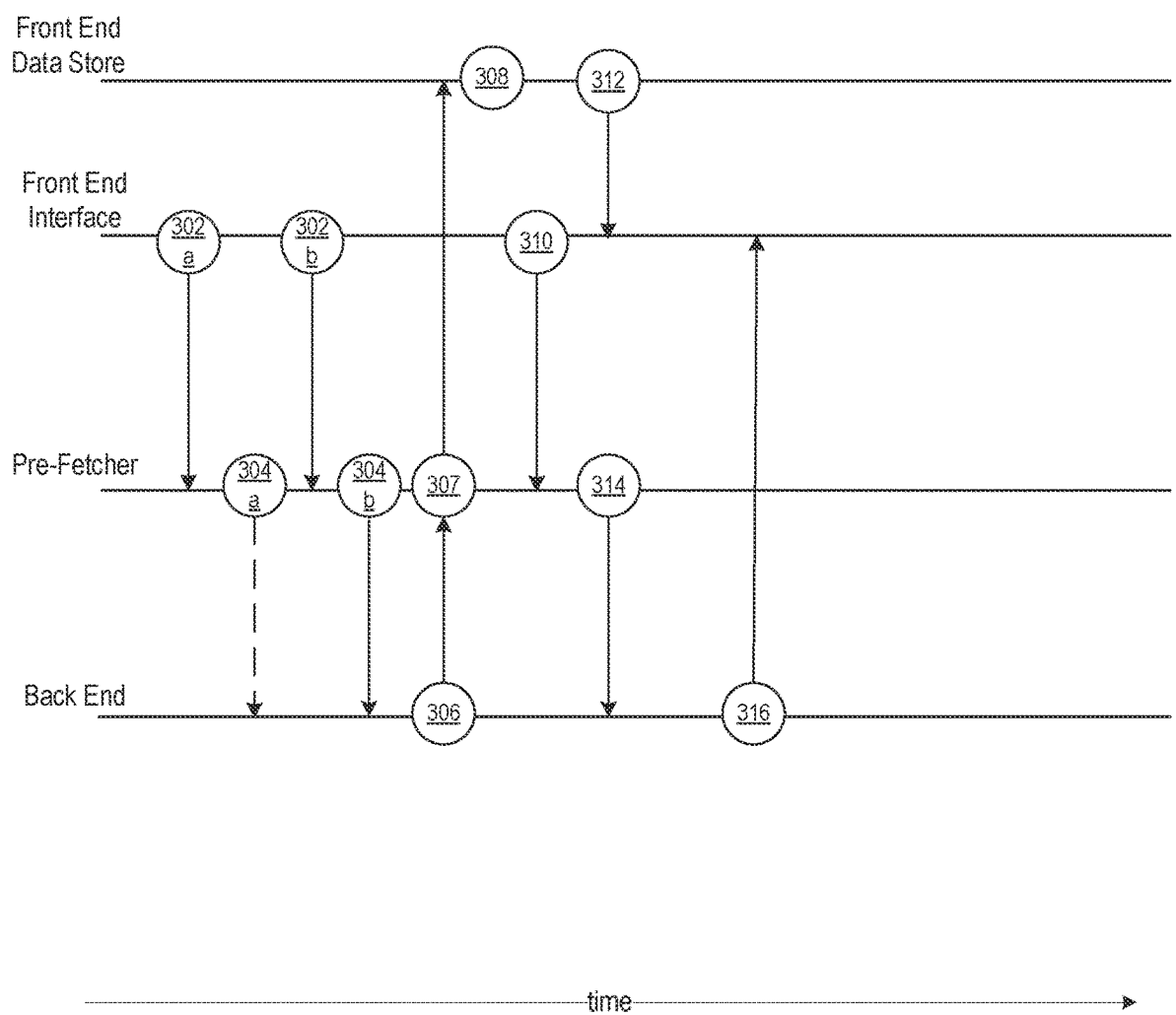
FIG. 3 is a timing diagram of an example method for pre-fetching search results in accordance with some implementations of the present disclosure.

FIG. 3 is a timing diagram of an example method for pre-fetching search results in accordance with some implementations of the present disclosure. In the timing diagram, the distances between elements are provided for illustration purposes and do not necessarily correspond to actual differences in relative amounts of elapsed time.

Portions of the method 300 are performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some implementations, the method 300 is performed by the pre-fetcher 140 of FIG. 1. Although shown in a particular sequence or order, unless otherwise specified, the order of the processes can be modified. Thus, the illustrated implementations should be understood only as examples, and the illustrated processes can be performed in a different order, and some processes can be performed in parallel. Additionally, one or more processes can be omitted in various implementations. Thus, not all processes are required in every implementation. Other process flows are possible.

In FIG. 3, at 302*a*, a front end interface, such as search system front end 114, generates a first partial input. For example, a user types the first couple of letters of a search term into a search input box. At 304*a*, a pre-fetcher, such as pre-fetcher 140, gathers session context data and determines whether the first partial input satisfies a pre-fetch threshold. If the first partial input satisfies the pre-fetch threshold, the pre-fetcher formulates a query and sends it to a back end, such as search system back end 132. If the first partial input does not satisfy the pre-fetch threshold, the pre-fetcher does not open a connection with search system back end 132 but rather waits for additional input from the front end interface.

At 302*b*, the front end interface generates a second partial input. For example, a user types a few more letters of the search term of 304*a* into the search input box. In this example, the second partial input satisfies the pre-fetch threshold. Thus, at 304*b*, the pre-fetcher formulates a query and sends it to the back end. If the pre-fetch threshold had been met for both of the inputs at 302*a* and 302*b*, then the pre-fetcher would have initiated the pre-fetching with the back end at both of 304*a* and 304*b*. That is, in some implementations, pre-fetching is conducted at the character level of input, i.e., each time the user adds a new character to the search input, the pre-fetcher sends a query to the back end.

At 306, the back end streams a first, highest probability result subset set to the front end interface via the pre-fetcher. At 307, the first result subset is decorated, e.g., a page containing the first result subset is constructed. In some implementations, both the page and the result subset are streamed to a front end data store such as pre-fetch data store 116. In other implementations, only the result subset is streamed to the front end data store, and the page is constructed by the search system front end.

At 308, the front end data store stores the first result subset. All of 302*a*, 304*a*, 302*b*, 304*b*, 306, 307, and 308 occur before an initiate search signal is received. At 310, the front end interface issues a second input, which contains an initiate search signal such as a user selection of a typeahead suggestion or the user pressing the enter key. At 312, in response to the second input, the pre-fetcher determines whether the first result subset matches the intent as indicated by the second input. For example, if the second input is a selection of a typeahead suggestion, the pre-fetcher determines whether the first result subset matches the typeahead suggestion. If the first result subset matches the intent as indicated by the second input, the first result subset stored in the front end data store is rendered by the front end interface. If the second input indicates that the user's intent is different from the intent data used to generate the first result subset, the first result subset is not rendered by the front end interface. The moving of the first result subset out of front end data store and into the front end interface is triggered by the receipt of the initiate search signal and the determination that the initiate search signal corresponds to the previously determined intent data. If no initiate search signal is received, implementations continue the iterative process of pre-fetching result subsets, pre-constructing pages, and streaming result subsets to the front end data store for each new portion of search input entered by the user.

Also, while the first result subset is being rendered at the front end interface, at 314, implementations open a persistent connection with the back end and continue streaming subsequent result subsets (also referred to as result clusters)

to the front end. For example, implementations stream a second, next-highest probability result subset to the front end over the persistent connection, and then subsequently stream lower-probability result sets to the front end if the session continues. The second result subset is streamed by the back end to the front end interface via the persistent connection at 316. Since the page has already been constructed and rendered with the first result subset, the second result subset is streamed directly to the front end without caching and rendered on the user's screen.

The subsequent result subsets can be streamed to the front end without being stored in the front end data store because the query and search intent already have been determined (e.g., with high confidence) and the search result page is already being rendered with the first result subset. Accordingly, subsequent result subsets (or result clusters) that match the query and search intent are pushed to the front end system, decorated, and rendered on the screen without being stored in the front end data store. For example, the page rendering for the cached first result subset obtained by the pre-fetcher is started in response to the initiate search signal. Once the page rendering of the first result subset has started, the subsequent result subsets do not need to be pre-fetched because they can be simply streamed to the already-rendered search results page over the real-time persistent connection. The receipt of the initiate search signal marks the end of prefetching and the beginning of streaming and rendering of result subsets on the user's screen.

FIG. 4A is flow diagram of an example implementation of a pre-fetching method in accordance with some implementations of the present disclosure.

The method 400 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some implementations, the method 400 is performed by the application software system 130 and/or the pre-fetcher 140 of FIG. 1. Although shown in a particular sequence or order, unless otherwise specified, the order of the processes can be modified. Thus, the illustrated implementations should be understood only as examples, and the illustrated processes can be performed in a different order, and some processes can be performed in parallel. Additionally, one or more processes can be omitted in various implementations. Thus, not all processes are required in every implementation. Other process flows are possible.

In FIG. 4A, a front end search interface 402 includes a text input box 404. A user has typed a partial input 406, "Comp" into the text input box 404. The user has not yet issued an initiate search signal. Instead, the cursor 407 is still in the text input box 404. Based on the partial input 406, the front end search interface 402 displays a ranked list of typeahead suggestions 408 and a "see all results" button 412. Each of the typeahead suggestions 408 includes the same search term, "Company Co." in combination with a different entity type suggestion by which the query could be filtered. For example, the top-ranked typeahead suggestion contains an entity type of "Company" while other suggestions include entity types of people, developers, ventures, recruiter, jobs, etc.

Before the user issues an initiate search signal, and based on the top-ranked typeahead suggestion 410, including the entity type of Company, at 414 a pre-fetcher such as pre-fetcher 140 pre-fetches a first result subset 418, a second result subset 422, and a third result subset 426, The first result subset corresponds to a query entity type of "Company" and a session entity type of "Job Seeker." The second result subset corresponds to a query entity type of "People." The third result subset corresponds to a query entity type of "Company" without a "Job Seeker" session entity type.

A page 416 is pre-constructed to display the result subsets 418, 422, 424, 426 in rank order on the page 416 along with a "see all people results" button 424. The page 416 can be pre-constructed by the pre-fetcher and streamed to the user device or created by the front end. In either case, page 416 does not need to be stored in the front end data store. Based on intent data associated with the partial input 406, the first result subset 418 is decorated with particular user interface controls, including a view jobs button 420. For example, the pre-fetcher has determined based on context data that the session entity type is job seeker and mapped the session entity type of job seeker to the view jobs button 420. The other, lower probability result sets are not decorated with the view jobs button 420 but instead with a connect button or a follow button.

The pre-constructed page 416 is loaded into the front end interface with at least the result set 418 as soon as an initiate search signal is received; for example, as soon as the user selects the top-ranked typeahead suggestion 410.

FIG. 4B is a flow diagram of another example implementation of a pre-fetching method in accordance with some implementations of the present disclosure.

The method 450 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some implementations, method 450 is performed by the application software system 130 and/or the pre-fetcher 140 of FIG. 1. Although shown in a particular sequence or order, unless otherwise specified, the order of the processes can be modified. Thus, the illustrated implementations should be understood only as examples, and the illustrated processes can be performed in a different order, and some processes can be performed in parallel. Additionally, one or more processes can be omitted in various implementations. Thus, not all processes are required in every implementation. Other process flows are possible.

FIG. 4B is similar to FIG. 4A, except that the intent data indicates that the highest-ranking query entity type is people, not company. In FIG. 4B, a front end search interface 452 includes a text input box 454. A user has typed a partial input 456, "Comp" into the text input box 404. The user has not yet issued an initiate search signal. Instead, the cursor 457 is still in the text input box 404. Based on the partial input 456, the front end search interface 452 displays a ranked list of typeahead suggestions 458 and a "see all results" button 462. Each of the typeahead suggestions 458 includes the same search term, "Company Co." in combination with a different entity type suggestion by which the query could be filtered. For example, the top-ranked suggestion contains an entity type of "Company" while other suggestions include entity types of people, developers, ventures, recruiter, jobs, etc.

Before the user issues an initiate search signal, and based on intent data and the typeahead suggestion 460, including the entity type of People, at 464 a pre-fetcher such as pre-fetcher 140 pre-fetches a first result subset 468. The first result subset corresponds to a query entity type of "People" and a session entity type of "Recruiter."

A page 466 to display the first result subset 468 is pre-constructed by the front end or, in some implementations, by the pre-fetcher. Based on intent data associated with the partial input 456, the first result subset 468 is decorated with a particular user interface control, a connect button 470. For example, the pre-fetcher has determined based on context data that the session entity type is recruiter and the front end has mapped the session entity type of recruiter to the connect button 470.

Once an initiate search signal is received, the first result subset 468 is retrieved from the front end data store and, along with pre-constructed page 466, is rendered on the front end interface at the user's device. The pre-constructed page can be created by the pre-fetcher and streamed to the front end, or created by the front end, so that no front end cache is needed to store the pre-constructed page. For example, as soon as the user selects the typeahead suggestion 460, the page 466 including the first result subset 468 is loaded into the front end interface.

FIG. 5 is a flow diagram of an example method for pre-fetching search results in accordance with some implementations of the present disclosure.

The method 500 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some implementations, the method 500 is performed by the pre-fetcher 140 of FIG. 1. Although shown in a particular sequence or order, unless otherwise specified, the order of the processes can be modified. Thus, the illustrated implementations should be understood only as examples, and the illustrated processes can be performed in a different order, and some processes can be performed in parallel. Additionally, one or more processes can be omitted in various implementations. Thus, not all processes are required in every implementation. Other process flows are possible.

At operation 502, the processing device determines a first input that is associated with a search session of a user device and contains at least a portion of a search term but does not initiate a search, and context data associated with the first input. For example, the processing device receives the first input from a search session of a user device. In some implementations, the context data includes a quantity of text in the first input and a search history associated with the user device. In some implementations, the context data includes a measurement, such as a measurement of a capability of the user device, a capability of a network used by the user device to connect to the search session, and/or user activity associated with the search session. In some implementations, the context data includes a session entity type associated with the first input and the search session. In some implementations, the context data includes one or more typeahead suggestions.

At operation 504, the processing device determines whether a combination of the first input and the context data satisfies a pre-fetch threshold. In some implementations, the processing device determines a threshold quantity of text based on the search history, and determines that the quantity of text in the first input satisfies the threshold quantity of text. In some implementations, the processing device determines that the measurement satisfies a threshold measurement value, such as a minimum network speed, a minimum network bandwidth, or a minimum amount of available cache at the user device. In some implementations, the processing device determines that the session entity type satisfies a threshold session entity type confidence value. If the combination of the first input and the context data satisfies the pre-fetch threshold, the processing device proceeds to operation 506. If the combination of the first input and the context data does not satisfy the pre-fetch threshold, the processing device returns to operation 502 and waits for additional input or ends the method 500.

At operation 506, the processing device determines intent data based on at least a portion of the context data. In some implementations, the intent data includes a query entity type associated with the first input. In some implementations, the processing determines the query entity type based on the session entity type. In some implementations, the intent data includes one or more typeahead suggestions that have a highest probability of being selected by the user device.

At operation 508, the processing device generates a search query based on the first input and the intent data. In some implementations, the processing device includes the query entity type in the search query as a filter.

At operation 510, the processing device receives, indexes, and store a first subset of search results that corresponds to the search query in a data store of the user device. For example, the processing device pre-fetches a first subset of search results from a search system back end based on the search query, pre-constructs a page containing the first subset of search results and at least one user interface element associated with the intent data, and streams the page to a cache at the user device. In some implementations, the processing device opens a persistent connection with a search system back end, such as a server, subscribes to an event log on the server, where the event log corresponds to the search query, listens for search results published by the server on the event log, and receives the first subset of search results on the persistent connection. In some implementations, the processing device selects, as the first subset, one or more entity type result sets from a set of entity type result sets, where the selected one or more entity type result sets have a highest probability of corresponding to the intent data. In some implementations, the processing device indexes the first subset of search results by an entity identifier or uses the entity identifier as a cache key, and uses the entity identifier to retrieve the first subset of search results from the data store at the user device.

At operation 512, the processing device determines whether a second input includes a signal to initiate the search. For example, the processing device receives the second input from the search session. In some implementations, the second input includes an enter command, a selection of a search element, a click, and/or a selection of a typeahead suggestion. If the processing device determines that the second input includes a signal to initiate the search, the processing device proceeds to operation 514. If the processing device determines that the second input does not include a signal to initiate the search, the processing device returns to operation 502 and waits for additional input or ends the method 500.

At operation 514, the processing device determines whether a combination of the second input and the intent data satisfies a query confidence threshold. In some implementations, the processing device determines that a typeahead entity type associated with a selected typeahead suggestion corresponds to a query entity type associated with the first input. If the processing device determines that a combination of the second input and the intent data satisfies the query confidence threshold, the processing device proceeds to operation 516. If the processing device determines that the combination of the second input and the intent data does not satisfy the query confidence threshold, the processing device returns to operation 502 and waits for additional input or ends the method 500.

At operation 516, the processing device initiates rendering of a page containing the first subset of search results in the search session of the user device. During or after the rendering of the page, in some implementations, the processing device pre-fetches a second subset of search results based on the second input, receives a third input from the search session, determines that the third input comprises a selection on the page, and based on the selection, initiates rendering of the second subset of search results in the search session of the user device.

FIG. 6 illustrates an example machine of a computer system 600 within which a set of instructions, for causing the machine to perform any one or more of the methodologies discussed herein, can be executed. In some implementations, the computer system 600 can correspond to a component of a networked computer system (e.g., the computer system 100 of FIG. 1) that includes, is coupled to, or utilizes a machine to execute an operating system to perform operations corresponding to the application software system 130, including the pre-fetcher 140 of FIG. 1.

The machine is connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine is a personal computer (PC), a smart phone, a tablet PC, a set-top box (STB), a Personal Digital Assistant (PDA), a cellular telephone, a web appliance, a server, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a memory 606 (e.g., flash memory, static random access memory (SRAM), etc.), an input/output system 610, and a data storage system 640, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 612 for performing the operations and steps discussed herein.

Instructions 612 include portions of the application software system 130 when those portions of the first party system are being executed by processing device 602. Thus, similar to the description above, pre-fetcher 140 is shown in dashed lines as part of instructions 612 to illustrate that, at times, portions of pre-fetcher 140 are executed by processing device 602. For example, when at least some portion of pre-fetcher 140 is embodied in instructions to cause processing device 602 to perform the method(s) described above, some of those instructions can be read into processing device 602 (e.g., into an internal cache or other memory) from main memory 604 and/or data storage system 640. However, it is not required that all of the pre-fetchers be included in instructions 612 at the same time and portions of the pre-fetcher are stored in one or more other components of computer system 600 at other times, e.g., when one or more portions of the pre-fetcher are not being executed by processing device 602.

The computer system 600 further includes a network interface device 608 to communicate over the network 620. Network interface device 608 provides a two-way data communication coupling to a network. For example, network interface device 608 can be an integrated-services digital network (ISDN) card, cable modem, satellite modem, or a modem to provide a data communication connection to a corresponding type of telephone line. As another example, network interface device 608 can be a local area network (LAN) card to provide a data communication connection to a compatible LAN. Wireless links can also be implemented. In any such implementation, network interface device 608 can send and receive electrical, electromagnetic, or optical signals that carry digital data streams representing various types of information.

The network link can provide data communication through at least one network to other data devices. For example, a network link can provide a connection to the world-wide packet data communication network commonly referred to as the "Internet," for example through a local network to a host computer or to data equipment operated by an Internet Service Provider (ISP). Local networks and the Internet use electrical, electromagnetic, or optical signals that carry digital data to and from computer system computer system 600.

Computer system 600 can send messages and receive data, including program code, through the network(s) and network interface device 608. In the Internet example, a server can transmit a requested code for an application program through the Internet and network interface device 608. The received code can be executed by processing device 602 as it is received, and/or stored in data storage system 640, or other non-volatile storage for later execution.

The input/output system 610 includes an output device, such as a display, for example a liquid crystal display (LCD) or a touchscreen display, for displaying information to a computer user, or a speaker, a haptic device, or another form of output device. The input/output system 610 can include an input device, for example, alphanumeric keys and other keys configured for communicating information and command selections to processing device 602. An input device can, alternatively or in addition, include a cursor control, such as a mouse, a trackball, or cursor direction keys for communicating direction information and command selections to processing device 602 and for controlling cursor movement on a display. An input device can, alternatively or in addition, include a microphone, a sensor, or an array of sensors, for communicating sensed information to processing device 602. Sensed information can include voice commands, audio signals, geographic location information, and/or digital imagery, for example.

The data storage system 640 includes a machine-readable storage medium 642 (also known as a computer-readable medium) on which is stored one or more sets of instructions 644 or software embodying any one or more of the methodologies or functions described herein. The instructions 644 can also reside, completely or at least partially, within the main memory 604 and/or within the processing device 602 during execution thereof by the computer system 600, the main memory 604 and the processing device 602 also constituting machine-readable storage media. In one implementation, the instructions 644 include instructions to implement functionality corresponding to a pre-fetcher (e.g., the pre-fetcher 140 of FIG. 1).

Dashed lines are used in FIG. 6 to indicate that it is not required that the pre-fetcher be embodied entirely in instructions 612, 614, and 644 at the same time. In one example, portions of the pre-fetcher are embodied in instructions 644, which are read into main memory 604 as instructions 614, and portions of instructions 614 are read into processing device 602 as instructions 612 for execution. In another example, some portions of the pre-fetcher are embodied in instructions 644 while other portions are embodied in instructions 614 and still other portions are embodied in instructions 612.

While the machine-readable storage medium 642 is shown in an example implementation to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the computing system 100, can carry out the computer-implemented methods 300A, 300B, 300C, 100, 500 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, which can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some implementations, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

Illustrative examples of the technologies disclosed herein are provided below. An implementation of the technologies may include any of the examples or a combination of the described below.

In an example 1, a method includes receiving first input from a search session of a user device, where the first input includes at least a portion of a search term but does not initiate a search; determining context data associated with the first input; determining that a combination of the first input and the context data satisfies a pre-fetch threshold; determining intent data based on at least a portion of the context data; generating a search query based on the first input and the intent data; pre-fetching a first subset of search results based on the search query; streaming the first subset of search results to a cache at the user device; constructing a page to display the first subset of search results and at least one user interface element associated with the intent data; receiving second input from the search session; determining that the second input includes a signal to initiate the search; determining that a combination of the second input and the intent data satisfies a query confidence threshold associated with the search query; retrieving the first subset of search results from the cache; and initiating rendering of the page including the retrieved first subset of search results in the search session of the user device.

An example 2 includes the subject matter of example 1, where: determining the context data includes determining a quantity of text in the first input and determining a search history associated with the user device; determining a threshold quantity of text based on the search history; and determining that the combination of the first input and the context data satisfies a pre-fetch threshold includes determining that the quantity of text in the first input satisfies the threshold quantity of text. An example 3 includes the subject matter of example 1 or example 2, where determining the context data includes: obtaining a measurement; where the measurement includes a measurement of at least one of a capability of the user device, a capability of a network used by the user device to connect to the search session, or user activity associated with the search session; and determining that the combination of the first input and the context data satisfies a pre-fetch threshold includes determining that the measurement satisfies a threshold measurement value. An example 4 includes the subject matter of any of examples 1-3, where: determining the context data includes determining a session entity type associated with the first input and the search session; and determining that the combination of the first input and the context data satisfies a pre-fetch threshold is based on at least one of (i) a determination that the session entity type satisfies a threshold session entity type confidence value or (ii) output generated by a machine learning model in response to input, to the machine learning model, of the combination of the first input and the context data. An example 5 includes the subject matter of any of examples 1-4, where: determining intent data associated with the first input includes determining a query entity type associated with the first input; and generating the search query based on the first input and the intent data includes including the query entity type in the search query as a filter. An example 6 includes the subject matter of example 5, further including: determining a session entity type associated with the first input and the search session; and determining the query entity type based on the session entity type. An example 7 includes the subject matter of any of examples 1-6, where determining the intent data includes: determining a plurality of typeahead suggestions; and identifying at least one typeahead suggestion of the plurality of typeahead suggestions as having a highest probability of being selected by the user device. An example 8 includes the subject matter of any of examples 1-7, where pre-fetching the first subset of search results based on the search query includes: opening a persistent connection with a server; subscribing to an event log on the server that corresponds to the search query; listening for search results published by the server on the event log; and receiving the first subset of search results on the persistent connection. An example 9 includes the subject matter of any of examples 1-8, where pre-fetching the first subset of search results based on the search query includes: determining a plurality of entity type result sets; and selecting at least one entity type result set from the plurality of entity type result sets as having a highest probability of corresponding to the intent data. An example 10 includes the subject matter of any of examples 1-9, where determining that the second input includes a signal to initiate the search includes: determining that the second input includes at least one of an enter command, a selection of a search element, a click, or a selection of a typeahead suggestion. An example 11 includes the subject matter of any of examples 1-10, where determining that the combination of the second input and the intent data satisfies the query confidence threshold includes: determining that a typeahead entity type associated with a selected typeahead suggestion corresponds to a query entity type associated with the first input. An example 12 includes the subject matter of any of examples 1-11, further including: based on the second input, streaming a second subset of search results to the user device; and initiating rendering of the second subset of search results in the search session of the user device.

In an example 13, a system includes: at least one memory; and at least one processor coupled to the at least one memory; where the at least one memory includes instructions that when executed by the at least one processor cause the at least one processor to perform operations including: determining first input and context data associated with the first input; where the first input is associated with a search session of a user device and includes at least a portion of a search term but does not initiate a search; determining that a combination of the first input and the context data satisfies a pre-fetch threshold; determining intent data based on at least a portion of the context data; generating a search query based on the first input and the intent data; receiving a first subset of search results that corresponds to the search query; indexing the first subset of search results by an entity identifier; storing the indexed first subset of search results in a data store at the user device; constructing a page to display at least the first subset of search results; determining that a second input associated with the search session includes a signal to initiate the search; determining that a combination of the second input and the intent data satisfies a query confidence threshold associated with the search query; retrieving the first subset of search results from the data store using the entity identifier; and initiating rendering of the page in the search session of the user device.

An example 14 includes the subject matter of example 13, where determining the context data includes: obtaining a measurement; where the measurement includes a measurement of at least one of a capability of the user device, a capability of a network used by the user device to connect to the search session, or user activity associated with the search session; and determining that the combination of the first input and the context data satisfies a pre-fetch threshold includes determining that the measurement satisfies a threshold measurement value. An example 15 includes the subject matter of example 13 or example 14, where: determining the context data includes determining a session entity type associated with the first input and the search session; and determining that the combination of the first input and the context data satisfies a pre-fetch threshold includes determining that the session entity type satisfies a threshold session entity type confidence value. An example 16 includes the subject matter of any of examples 13-15, where: determining intent data associated with the first input includes determining a query entity type associated with the first input; and generating the search query based on the first input and the intent data includes including the query entity type in the search query as a filter. An example 17 includes the subject matter of example 16, where the instructions, when executed by the at least one processor, cause the at least one processor to perform operations further including: determining a session entity type associated with the first input and the search session; and determining the query entity type based on the session entity type. An example 18 includes the subject matter of any of examples 13-17, where determining the intent data includes: determining a plurality of typeahead suggestions; and identifying at least one typeahead suggestion of the plurality of typeahead suggestions as having a highest probability of being selected by the user device. An example 19 includes the subject matter of any of examples 13-18, where pre-fetching the first subset of search results based on the search query includes: determining a plurality of entity type result sets; and selecting at least one entity type result set from the plurality of entity type result sets as having a highest probability of corresponding to the intent data. An example 20 includes the subject matter of any of examples 13-19, where determining that the combination of the second input and the intent data satisfies the query confidence threshold includes: determining that a typeahead entity type associated with a selected typeahead suggestion corresponds to a query entity type associated with the first input.

In the foregoing specification, implementations of the disclosure have been described with reference to specific example implementations thereof. It will be evident that various modifications can be made thereto without departing from the broader spirit and scope of implementations of the disclosure as set forth in the following claims. The specification and drawings are, accordingly, to be regarded in an illustrative sense rather than a restrictive sense.

The invention claimed is:

1. A method, comprising:
receiving first input from a search session of a user device;
wherein the first input comprises at least a portion of a search term but does not initiate a search;
determining context data associated with the first input;
determining that a combination of the first input and the context data satisfies a pre-fetch threshold;
determining intent data based on at least a portion of the context data;
generating a search query based on the first input and the intent data;
pre-fetching at least a first subset of search results and a second subset of search results based on the search query, wherein the first subset of search results is filtered based on a first query entity type associated with the first input and is retrieved based on a first session entity type of a user of the search session, the second subset of search results is filtered based on a second query entity type associated with the first input and is retrieved based on a second session entity type of the user of the search session;
streaming the first subset of search results to a cache at the user device;
constructing a page to display at least the first subset of search results and at least one user interface element associated with the intent data;
receiving second input from the search session;
determining that the second input includes a signal to initiate the search;
determining that a combination of the second input and the intent data satisfies a query confidence threshold associated with the search query;
retrieving the first subset of search results from the cache; and
initiating rendering of the page including the retrieved first subset of search results in the search session of the user device.

2. The method of claim 1, wherein:
determining the context data comprises determining a quantity of text in the first input and determining a search history associated with the user device;
determining a threshold quantity of text based on the search history; and
determining that the combination of the first input and the context data satisfies a pre-fetch threshold comprises determining that the quantity of text in the first input satisfies the threshold quantity of text.

3. The method of claim 1, wherein determining the context data comprises:
obtaining a measurement;
wherein the measurement comprises a measurement of at least one of a capability of the user device, a capability of a network used by the user device to connect to the search session, or user activity associated with the search session; and
determining that the combination of the first input and the context data satisfies a pre-fetch threshold comprises determining that the measurement satisfies a threshold measurement value.

4. The method of claim 1, wherein:
determining that the combination of the first input and the context data satisfies a pre-fetch threshold is based on at least one of (i) a determination that the session entity type satisfies a threshold session entity type confidence value or (ii) output generated by a machine learning model in response to input, to the machine learning model, of the combination of the first input and the context data.

5. The method of claim 1, wherein:
generating the search query based on the first input and the intent data comprises including the query entity type in the search query as a filter.

6. The method of claim 5, further comprising:
determining the query entity type based on the session entity type.

7. The method of claim 1, wherein determining the intent data comprises:
determining a plurality of typeahead suggestions; and
identifying at least one typeahead suggestion of the plurality of typeahead suggestions as having a highest probability of being selected by the user device.

8. The method of claim 1, wherein pre-fetching the first subset of search results based on the search query comprises:
opening a persistent connection with a server;
subscribing to an event log on the server that corresponds to the search query;
listening for search results published by the server on the event log; and
receiving the first subset of search results on the persistent connection.

9. The method of claim 1, wherein pre-fetching the first subset of search results based on the search query comprises:
determining a plurality of entity type result sets; and
selecting at least one entity type result set from the plurality of entity type result sets as having a highest probability of corresponding to the intent data.

10. The method of claim 1, wherein determining that the second input includes a signal to initiate the search comprises:
determining that the second input comprises at least one of an enter command, a selection of a search element, a click, or a selection of a typeahead suggestion.

11. The method of claim 1, wherein determining that the combination of the second input and the intent data satisfies the query confidence threshold comprises:
determining that a typeahead entity type associated with a selected typeahead suggestion corresponds to a query entity type associated with the first input.

12. The method of claim 1, further comprising:
based on the second input, streaming the second subset of search results to the user device; and
initiating rendering of the second subset of search results in the search session of the user device.

13. A system, comprising:
at least one memory; and
at least one processor coupled to the at least one memory;

wherein the at least one memory comprises instructions that when executed by the at least one processor cause the at least one processor to perform operations comprising:
determining first input and context data associated with the first input;
wherein the first input is associated with a search session of a user device and comprises at least a portion of a search term but does not initiate a search;
determining that a combination of the first input and the context data satisfies a pre-fetch threshold;
determining intent data based on at least a portion of the context data;
generating a search query based on the first input and the intent data;
receiving at least a first subset of search results and a second subset of search results that corresponds to the search query, wherein the first subset of search results is filtered based on a first query entity type associated with the first input and is retrieved based on a first session entity type of a user of the search session, the second subset of search results is filtered based on a second query entity type associated with the first input and is retrieved based on a second session entity type of the user of the search session;
indexing the first subset of search results by an entity identifier;
storing the indexed first subset of search results in a data store at the user device;
constructing a page to display at least the first subset of search results;
determining that a second input associated with the search session includes a signal to initiate the search;
determining that a combination of the second input and the intent data satisfies a query confidence threshold associated with the search query;
retrieving at least the first subset of search results from the data store using the entity identifier; and
initiating rendering of the page in the search session of the user device.

14. The system of claim 13, wherein determining the context data comprises:
obtaining a measurement;
wherein the measurement comprises a measurement of at least one of a capability of the user device, a capability of a network used by the user device to connect to the search session, or user activity associated with the search session; and
determining that the combination of the first input and the context data satisfies a pre-fetch threshold comprises determining that the measurement satisfies a threshold measurement value.

15. The system of claim 13, wherein:
determining the context data comprises determining a session entity type associated with the first input and the search session; and
determining that the combination of the first input and the context data satisfies a pre-fetch threshold comprises determining that the session entity type satisfies a threshold session entity type confidence value.

16. The system of claim 13, wherein:
determining intent data associated with the first input comprises determining a query entity type associated with the first input; and
generating the search query based on the first input and the intent data comprises including the query entity type in the search query as a filter.

17. The system of claim 16, wherein the instructions, when executed by the at least one processor, cause the at least one processor to perform operations further comprising:
determining a session entity type associated with the first input and the search session; and
determining the query entity type based on the session entity type.

18. The system of claim 13, wherein determining the intent data comprises:
determining a plurality of typeahead suggestions; and
identifying at least one typeahead suggestion of the plurality of typeahead suggestions as having a highest probability of being selected by the user device.

19. The system of claim 13, wherein pre-fetching the first subset of search results based on the search query comprises:
determining a plurality of entity type result sets; and
selecting at least one entity type result set from the plurality of entity type result sets as having a highest probability of corresponding to the intent data.

20. The system of claim 13, wherein determining that the combination of the second input and the intent data satisfies the query confidence threshold comprises:
determining that a typeahead entity type associated with a selected typeahead suggestion corresponds to a query entity type associated with the first input.

* * * * *